US008118249B2

(12) United States Patent
Aihara et al.

(10) Patent No.: US 8,118,249 B2
(45) Date of Patent: Feb. 21, 2012

(54) WEBBING WINDER

(75) Inventors: Kazuhiko Aihara, Aichi-ken (JP);
Akira Sumiyashiki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 459 days.

(21) Appl. No.: 12/390,256

(22) Filed: Feb. 20, 2009

(65) Prior Publication Data

US 2009/0218432 A1 Sep. 3, 2009

(30) Foreign Application Priority Data

Feb. 29, 2008 (JP) ................................. 2008-049395

(51) Int. Cl.
*B60R 22/41* (2006.01)
*B60R 22/405* (2006.01)

(52) U.S. Cl. ..................................... 242/383.1
(58) Field of Classification Search ............... 242/383.1, 242/383.2, 383.5, 384.1; 280/806, 807; 297/478
See application file for complete search history.

(56) References Cited

U.S. PATENT DOCUMENTS

| 4,570,873 | A | | 2/1986 | Kurtti |
| 4,725,014 | A | * | 2/1988 | Ueda ........................... 242/382.1 |
| 4,729,523 | A | * | 3/1988 | Saitou et al. ................ 242/383.1 |
| 4,757,954 | A | * | 7/1988 | Doty ........................... 242/384.1 |
| 5,169,085 | A | * | 12/1992 | Kalbantner et al. ........ 242/383.1 |
| 5,484,118 | A | * | 1/1996 | Fujimura et al. ............ 242/384.2 |
| 6,354,528 | B1 | * | 3/2002 | Nagata et al. ................ 242/374 |
| 2004/0079827 | A1 | * | 4/2004 | Sumiyashiki et al. ...... 242/383.2 |
| 2005/0184185 | A1 | * | 8/2005 | Holbein et al. .............. 242/374 |
| 2007/0290091 | A1 | * | 12/2007 | Mori ............................ 242/383.1 |

FOREIGN PATENT DOCUMENTS

| DE | 10 2006 037 544 A1 | 2/2008 |
| JP | 5-193441 A | 8/1993 |

OTHER PUBLICATIONS

Office Action dated May 28, 2010 issued by the Chinese Patent Office in corresponding Chinese Patent Application No. 200910126319.8.

* cited by examiner

*Primary Examiner* — Michael Mansen
*Assistant Examiner* — Scott Haugland
(74) *Attorney, Agent, or Firm* — Roberts Mlotkowski Safran & Cole, P.C.

(57) ABSTRACT

In a webbing winder, when a webbing belt is wound around a spool, a V gear is rotated in a winding direction together with a W pawl, a friction spring, and a contact member, thereby generating a frictional force between the contact member and a sensor holder. As a consequence, the friction spring and the contact member are located at a restriction position, so that the friction spring engages with an engaging surface of the W pawl. Therefore, even if the spool and the V gear are rapidly and slightly rotated in a withdrawal direction in reaction when the webbing belt is completely wound by the spool, the W pawl cannot mesh with a ratchet gear formed at the sensor holder due to the restriction of oscillation of the W pawl, thus preventing any end lock.

5 Claims, 5 Drawing Sheets

WEBBING WINDER

CROSS-REFERENCE TO RELATED APPLICATION

This application claims priority under 35 USC 119 from Japanese Patent Application No. 2008-49395, the disclosures of which is incorporated by references herein.

BACKGROUND

1. Technical Field

The present invention relates to a webbing winder which winds a webbing belt for restraining a body of a passenger.

2. Related Art

As disclosed in, for example, Japanese Patent Application Laid-open (JP-A) No. 5-193441, a webbing winder constituting a seat belt device for a vehicle is provided with a lock mechanism which restricts rotation of a reel shaft in a withdrawal direction during rapid deceleration of the vehicle. A lock gear constituting the lock mechanism disclosed in JP-A No. 5-193441 can be relatively rotated coaxially with the reel shaft. When the reel shaft is rotated relatively to the lock gear in the withdrawal direction, teeth of each of a main pawl and a backup pawl mesh with inner teeth formed on both side walls of a frame in association with the relative rotation, thereby restricting the rotation of the reel shaft in the withdrawal direction. There are two types of configurations which generate the relative rotation between the reel shaft and the lock gear. One of the two configurations is deceleration detecting means. The deceleration detecting means is provided with an inertial member which makes an inertial movement during the rapid deceleration of the vehicle, and therefore, a lock pawl pushed up by the inertial member which makes the inertial movement meshes with outer teeth of the lock gear, thereby restricting the rotation of the lock gear, so as to allow the lock gear to be rotated relatively to the reel shaft which is rotated in the withdrawal direction.

The other configuration which generates the relative rotation between the reel shaft and the lock gear is another inertial member disposed in the lock gear independently of the inertial member of the deceleration detecting means. This inertial member is connected to the lock gear via a spring. When the lock gear is rapidly rotated in the withdrawal direction together with the reel shaft, the inertial member generates a rotational delay with respect to the lock gear against an urging force of the spring due to the inertia. The inertial member is moved outward in a rotationally radial direction of the lock gear simultaneously with the rotation relative to the lock gear owing to the rotational delay, to mesh with a ratchet gear of an inner gear formed inside of a cover, thereby stopping the rotation of the inertial member, and further, the lock gear. Thus, the rotation of the lock gear is stopped, so that the lock gear is rotated relatively to the reel shaft which is rotated in the withdrawal direction.

Here, if a lock mechanism is accidentally operated immediately after a webbing belt is completely wound by the reel shaft, the reel shaft is put into a so-called "end lock state," in which it cannot be rotated in this state in the withdrawal direction. Since the reel shaft cannot be rotated in the withdrawal direction in this end lock state, the webbing belt is hardly drawn. As a consequence, the webbing winder is configured such that the lock pawl of the deceleration detecting means cannot mesh with the outer teeth of the lock gear when the webbing belt is completely wound in the above-described JP-A No. 5-193441, thus avoiding the end lock state.

However, if a spool is rotated rapidly and slightly in the withdrawal direction in reaction immediately after the webbing belt is completely wound, the inertial member disposed in the lock gear accidentally meshes with the ratchet gear formed at the cover. In this state, if the spool is rotated in the withdrawal direction to draw out the webbing belt, the lock mechanism is undesirably operated so as to be put into the end lock state.

SUMMARY

In consideration of the above-described fact, the present invention provides a webbing winder which can prevent any end lock state even if a spool is rotated in a withdrawal direction in reaction immediately after the winding of a webbing belt is stopped.

A webbing winder according to a first aspect of the invention includes: a spool which is rotated in a winding direction so as to wind a webbing belt and it is rotated in a withdrawal direction so as to draw out the webbing belt; a rotary member which is rotatably disposed relatively to the spool, and is connected in such a manner as to be able to rotate following along with the spool; a locking member which is operated to restrict the rotation of the spool in the withdrawal direction; a rotation detecting member which is disposed in the rotary member, and is displaced in a predetermined lock start direction so as to actuate the locking member when the rotary member is rotated at a predetermined speed or higher in the withdrawal direction; and a restricting member which is disposed in the rotary member, and is able to be moved upon generating a frictional force by the rotation of the rotary member, so as to restrict the rotation detecting member from being displaced in the lock start direction in reaction to stoppage of winding of the webbing belt by the spool by engagement with the rotation detecting member.

In the webbing winder according to the first aspect of the invention, when the spool is rotated toward the winding direction, the webbing belt is wound around the spool. When the spool is rapidly stopped when the winding of the webbing belt is stopped by the spool, the rotary member, which is rotated following along with the spool, may be rapidly and slightly rotated in the withdrawal direction in reaction. Basically, the rotation detecting member is displaced in the lock start direction in the webbing winder according to the invention in association with the rapid rotation of the rotary member in the withdrawal direction, whereby the locking member locks the spool so as to restrict the rotation of the spool in the withdrawal direction.

Here, the restricting member disposed in the rotary member can be moved upon generating the frictional force by the rotation of the rotary member.

In the case where the rotary member is rapidly rotated in the withdrawal direction in reaction when the winding of the webbing belt is stopped by the spool in the webbing winder according to the invention, the restricting member engages with the rotation detecting member, thereby restricting the displacement of the rotation detecting member in the lock start direction. In this case, the locking member cannot restrict the rotation of the spool in the withdrawal direction (that is, the locking member cannot be put into a so-called "end lock state"). As a consequence, the webbing belt can be readily drawn again.

In a webbing winder according to a second aspect of the invention, the restricting member inhibits a displacement restriction of the rotation detecting member in the lock start direction in a rotation state of the rotary member in the withdrawal direction which is not the rotation stop reaction in the winding direction.

In the webbing winder according to the second aspect of the invention, the restricting member is inhibited from restricting the displacement of the rotation detecting member in the lock start direction in the state in which the rotary member is rotated in the withdrawal direction not in reaction when the webbing belt is stopped from being wound. A body of a passenger in a moving vehicle rapidly pulls the webbing belt, and therefore, the rotary member is rapidly rotated in the withdrawal direction together with the spool. At this time, the rotation detecting member can be displaced in the lock start direction, thereby actuating the locking member so as to restrict the rotation of the spool in the withdrawal direction.

In a webbing winder according to a third aspect of the invention, the restricting member is movably interposed between a restriction position, at which the rotation detecting member can be restricted from being displaced in the lock start direction, and a non-restriction position, at which the rotation detecting member is allowed to be displaced in the lock start direction, so that the restricting member is displaced to the restriction position by the rotation of the rotary member in the winding direction.

In the webbing winder according to the third aspect of the invention, the rotation of the rotary member in the winding direction separates the restricting member from the non-restriction position. As a consequence, the restricting member can be moved to the restriction position. In the state immediately after the rotation of the spool in the winding direction is stopped, the restricting member is located at the restriction position. From this state, the rotary member is rapidly and slightly rotated in the withdrawal direction, so that the restricting member restricts the displacement of the rotation detecting member when the rotation detecting member tends to be displaced in the lock start direction.

Here, the restricting member is configured in such a manner as to be separated from the non-restriction position by the rotation of the rotary member in the winding direction, as described above. Therefore, basically (that is, in the case where the rotary member is not rotated in the withdrawal direction in reaction when the spool stops winding the webbing belt), the restricting member cannot be separated from the non-restriction position even if the rotary member is rotated in the withdrawal direction, so that the restricting member cannot reach the restriction position. Therefore, even if the spool is rotated in the withdrawal direction normally or during the rapid deceleration of the vehicle, and accompanying this, the rotary member is rotated in the withdrawal direction, the restricting member cannot be moved to the restriction position. Thus, the restricting member cannot accidentally inhibit the displacement of the rotation detecting member.

A webbing winder according to a fourth aspect of the invention further includes an urging member which urges the rotation detecting member in a direction opposite to the lock start direction.

In the webbing winder according to the fourth aspect of the invention, the rotation detecting member is urged in the direction opposite to the lock start direction by the urging member. As a consequence, upon completion of the rotation of the rotary member in the withdrawal direction at a predetermined speed or higher, the rotation detecting member displaced in the lock start direction is displaced in the direction opposite to the lock start direction by the urging force of the urging member, to be thus returned to the original state, thereby releasing the rotation restriction of the spool by the locking member.

In a webbing winder according to a fifth aspect of the invention, the restricting member includes a bent rod-like friction spring and a contact member; and the friction spring is rotatably supported at one end thereof by the rotary member, and the friction spring is fitted at the other end thereof around the contact member.

In the webbing winder according to the fifth aspect of the invention, the restricting member for restricting the oscillation in the lock start direction consists of an integral part including only two members, that is, the friction spring and the contact member. Thus, a space can be saved, mountability of the rotary member on the restricting member can be enhanced, and the rotary member can be miniaturized. In addition, a cost can be reduced.

In a webbing winder according to a sixth aspect of the invention, the rotation detecting member has an engaging portion formed at one end thereof; and a part of the friction spring is inserted into the engaging portion when the restricting member engages with the rotation detecting member.

In the webbing winder according to the sixth aspect of the invention, the rotation detecting member has not only the function of actuating the locking member but also the function of being oscillated in the lock start direction with respect to the rotary member by the rotation of the rotary member. Therefore, the space can be further saved, the mountability on the rotary member can be further enhanced, and the rotary member can be further miniaturized. In addition, the cost can be further reduced.

BRIEF DESCRIPTION OF THE DRAWINGS

Exemplary Embodiments of the present invention will be described in detail based on the following figures, wherein.

DETAILED DESCRIPTION

First Exemplary Embodiment

<Configuration of First Exemplary Embodiment According to Invention>

Figure 1:
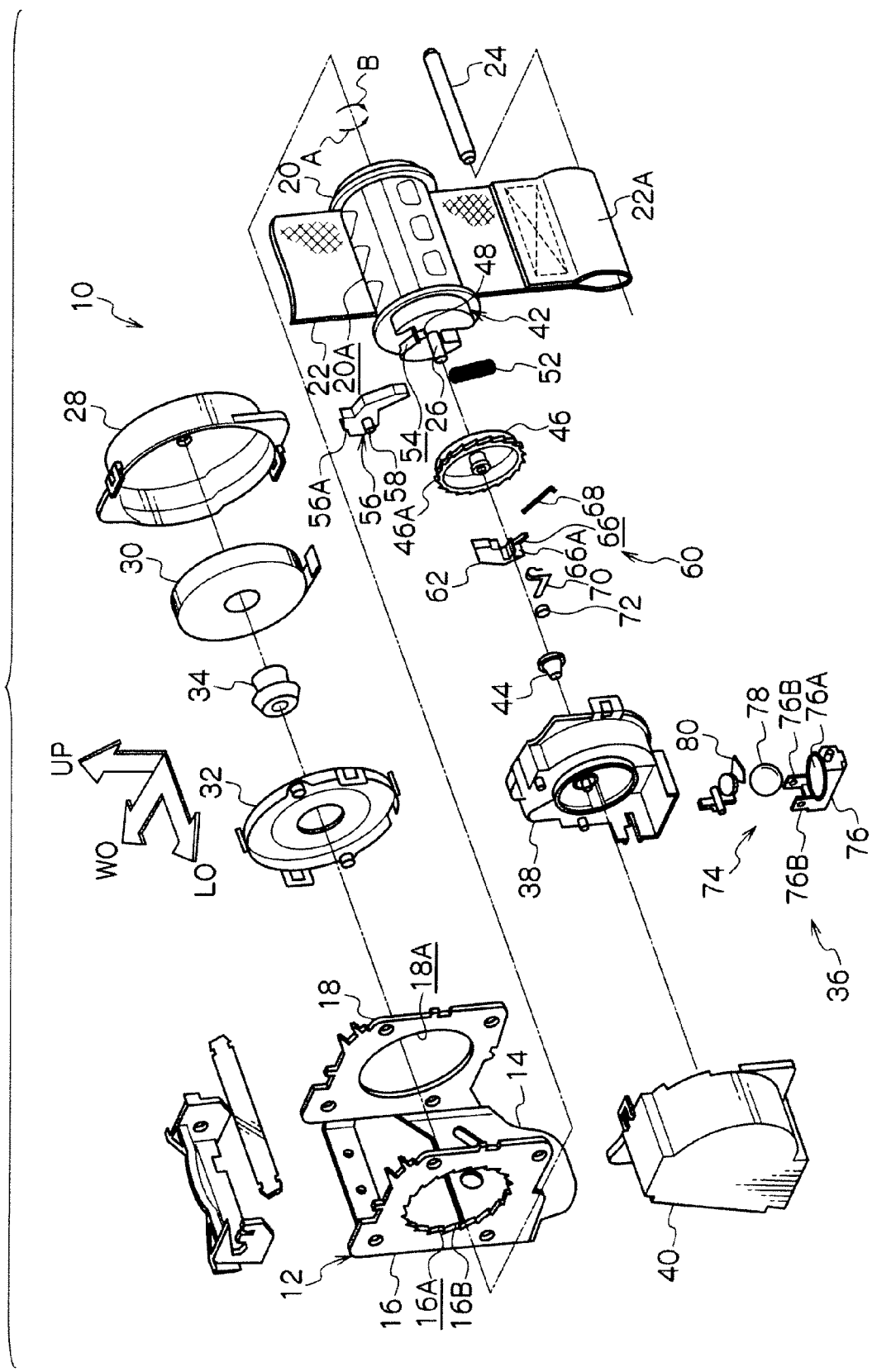
FIG. 1 is an exploded perspective view showing the configuration of a webbing winder in a first exemplary embodiment according to the invention.

FIG. 1 is an exploded perspective view showing the entire configuration of a webbing winder 10 in a first exemplary embodiment according to the present invention. In FIG. 1, an arrow LO indicates one side in a lengthwise direction of a vehicle; another arrow WO indicates one side in a widthwise direction of the vehicle; and a further arrow UP indicates an upward direction.

As shown in FIG. 1, the webbing winder 10 is provided with a frame 12. The frame 12 includes, for example, a back plate 14 disposed substantially vertically in the widthwise direction of the vehicle. The back plate 14 is secured to a chassis in the vicinity of, for example, a lower end of a center pillar of the vehicle via tightening means such as a bolt, so that the webbing winder 10 is installed to the chassis. A leg plate 16 is bent toward the other side in the widthwise direction of the vehicle from one side end in the lengthwise direction of the vehicle of the back plate 14 whereas another leg plate 18 is bent toward the other side in the widthwise direction of the vehicle from the other side end in the lengthwise direction of the vehicle of the back plate 14. In the leg plate 16 and the leg plate 18 are penetratively formed circular disposition holes 16A and 18A, respectively.

Between the disposition hole 16A of the leg plate 16 and the disposition hole 18A of the leg plate 18 is interposed a substantially cylindrical spool 20 whose axial direction is aligned along the lengthwise direction of the vehicle. In the spool 20 is formed an insertion hole 20A which is opened at both ends thereof to an outer peripheral surface of the spool 20. The opening of the insertion hole 20A is formed into a longitudinal slit along the axial direction of the spool 20. Into the insertion hole 20A is inserted a base end of an elongated webbing belt 22.

A cylindrical portion 22A penetrating in a widthwise direction is formed at the base end of the webbing belt 22. A rod-like stopper shaft 24 is disposed inside of the cylindrical portion 22A passing the insertion hole 20A. The stopper shaft 24 is fitted to the spool 20, so that the base end of the webbing belt 22 can be prevented from slipping from the insertion hole 20A. As a consequence, the spool 20 is rotated on an axis thereof in one winding direction (in a direction indicated by an arrow A), so that the webbing belt 22 is wound around the spool 20 from the base end in a laminate manner, to be thus accommodated therearound.

A substantially cylindrical support shaft 26 is integrally disposed across both sides in the spool 20 in the lengthwise direction of the vehicle. The support shaft 26 can be rotated integrally with the spool 20. The support shaft 26 projects outward across both sides in the spool 20 in the lengthwise direction of the vehicle. A longitudinal direction of the support shaft 26 is aligned in the axial direction of the spool 20. The support shaft 26 on one side in the lengthwise direction of the vehicle projects on one side in the lengthwise direction of the vehicle in the leg plate 16 whereas the support shaft 26 on the other side in the lengthwise direction of the vehicle projects on the other side in the lengthwise direction of the vehicle in the leg plate 18.

On the other side in the lengthwise direction of the vehicle in the leg plate 18 is disposed a spring cover 28. The spring cover 28 is formed into a box shape opened toward one side in the lengthwise direction of the vehicle. The spring cover 28 is fixed to the leg plate 18 by the engagement of tightening means such as a screw or an engagement pawl formed at the spring cover 28 or the leg plate 18. Inside of the spring cover 28 is housed a spiral spring 30 serving as winding means. The spiral spring 30 is configured in such a manner as to be rotatably displaced at the inside end thereof spirally in a withdrawal direction opposite to the winding direction with respect to the outside end thereof in the spiral direction (in a direction indicated by an arrow B), so that its urging force is gradually increased.

The spiral spring 30 is locked at the outside end thereof, in the spiral direction, to a spring seat 32, which is disposed on one side in the spiral spring 30 in the lengthwise direction of the vehicle and into which the support shaft 26 on the other side in the lengthwise direction of the vehicle is inserted. The spring seat 32 is secured to the spring cover 28. The spiral spring 30 is connected at the outside end thereof to the leg plate 18 (the frame 12) in the spiral direction via the spring seat 32 and the spring cover 28. An adapter 34 is securely fitted at the axial portion thereof to the support shaft 26 on the other side in the lengthwise direction of the vehicle at the other side in the spring seat 32 in the lengthwise direction of the vehicle. Around the adapter 34 is fitted the inside end in the direction of the spiral spring 30.

On one side in the leg plate 16 in the lengthwise direction of the vehicle is disposed a lock mechanism 36, which is provided with a sensor holder 38. The sensor holder 38 is formed into a recessed shape partly opened toward the other side in the lengthwise direction of the vehicle, to be thus secured to the leg plate 16. On one side in the sensor holder 38 in the lengthwise direction of the vehicle is disposed a sensor cover 40. Around the sensor cover 40 is formed an engagement pawl. The sensor cover 40 is secured to the leg plate 16 integrally with the sensor holder 38 while holding the sensor holder 38 therein.

A lock base 42 is integrally disposed at one side end in the spool 20 in the lengthwise direction of the vehicle. The support shaft 26 on one side in the lengthwise direction of the vehicle projects from the lock base 42. The spool 20, the support shaft 26, and the lock base 42 can be rotated coaxially and integrally with each other. At a tip of the support shaft 26 on one side in the lengthwise direction of the vehicle is secured a bush 44, which is rotatably supported by the sensor holder 38. Namely, the support shaft 26 on one side in the lengthwise direction of the vehicle is rotatably supported by the sensor holder 38 via the bush 44.

Figure 3:
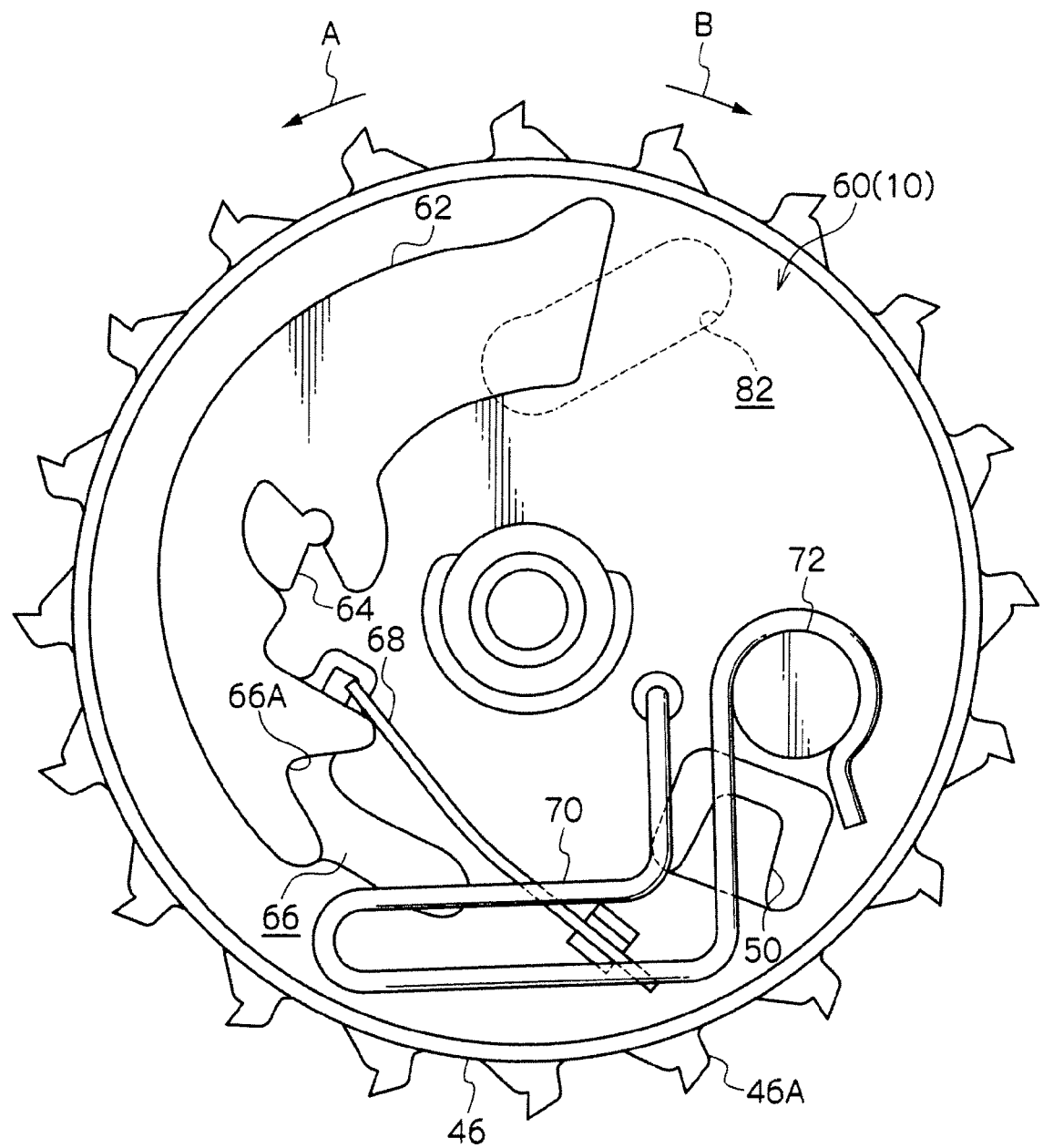
FIG. 3 is a front view showing a state in which the rotation detecting member of the webbing winder in the first exemplary embodiment according to the invention is displaced in the lock start direction.

Between the sensor holder 38 and the lock base 42 is interposed a V gear 46 serving as a rotary member (see FIG. 3). The V gear 46 is housed inside of the sensor holder 38. The V gear 46 is formed into a bottomed cylindrical shape opened toward one side in the lengthwise direction of the vehicle. Around the V gear 46 is formed a ratchet gear 46A (an outer gear). The support shaft 26 on one side in the lengthwise direction of the vehicle penetrates the V gear 46 between the lock base 42 and the bush 44. Therefore, the V gear 46 is rotatably fixed coaxially with the support shaft 26 on one side in the lengthwise direction of the vehicle.

Between a lock projection 48 formed at the lock base 42 and another lock projection 50 formed at the V gear 46 is stretched a return spring 52. The return spring 52 consists of a compression coil spring, thereby urging the V gear 46 with respect to the lock base 42 in the withdrawal direction.

At the lock base 42 is formed a movement groove 54. Inside of the movement groove 54 is movably disposed a locking plate 56 serving as a locking member. In the locking plate 56 is integrally formed a cylindrical guide projection 58. The guide projection 58 projects from the locking plate 56 toward one side in the lengthwise direction of the vehicle. At the other side surface in the lengthwise direction of the vehicle in the V gear 46 is formed an elongated guide slot 82 (see FIG. 2). The guide projection 58 is locked to one end of the guide slot 82 by the urging force of the return spring 52. The locking plate 56 is housed inside of the lock base 42 (inside of the movement groove 54). The lock of the guide projection 58 to one end of the guide slot 82 stops the rotation of the V gear 46 by the return spring 52 with respect to the lock base 42 in the withdrawal direction, and normally, the V gear 46 can be rotated integrally with the lock base 42.

A rotation detecting mechanism 60 is disposed from the sensor holder 38 to the V gear 46. The rotation detecting mechanism 60 is provided with a cylindrical gear ring, not shown, to be engaged (to be meshed). The gear ring is housed inside of the sensor holder 38, and further, is integrated with the sensor holder 38. The gear ring is coaxially inserted in the vicinity in and around the V gear 46. At the inner circumferential surface of the gear ring is formed a ratchet gear.

Figure 2:
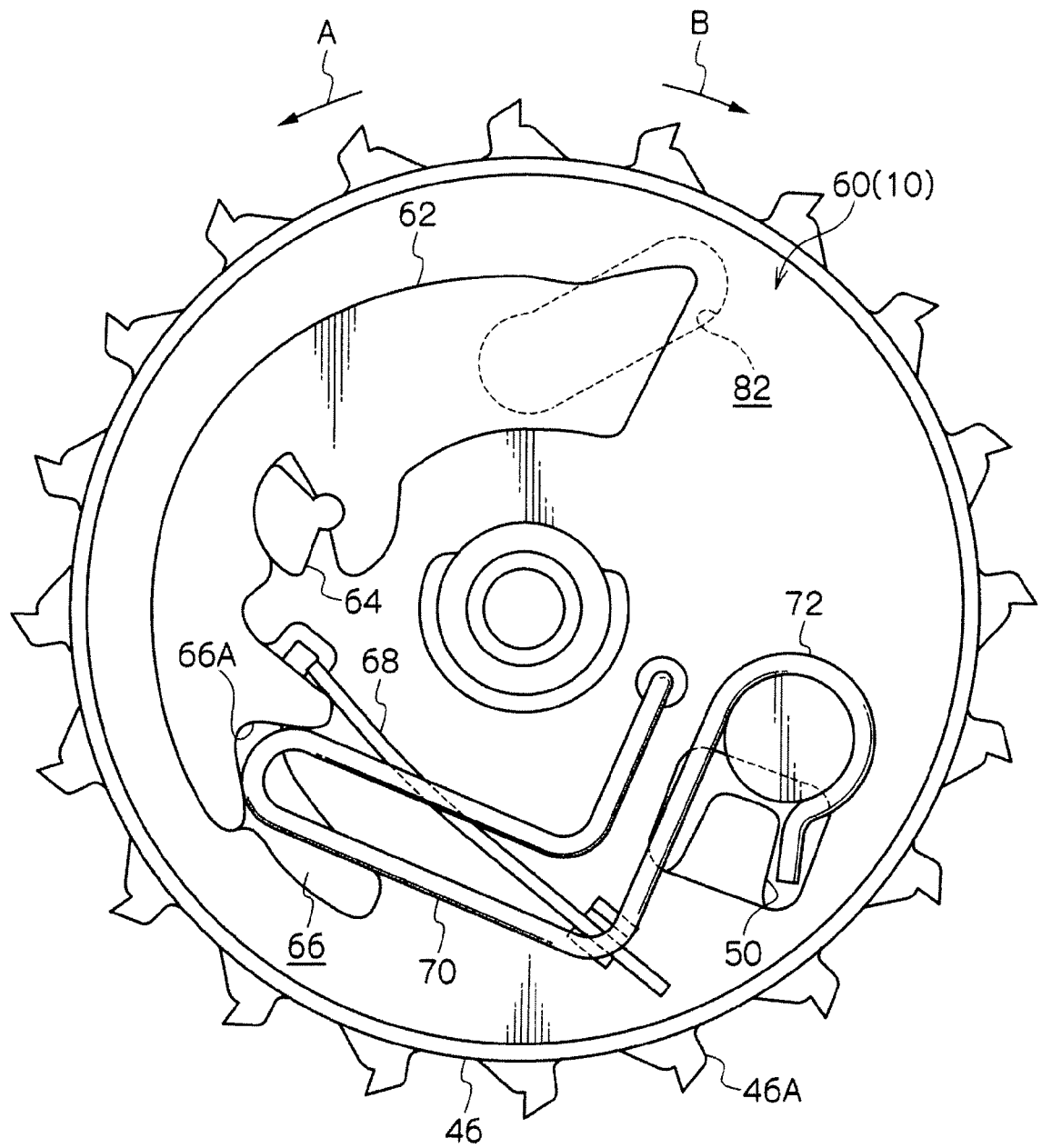
FIG. 2 is a front view showing a state in which a restricting member of the webbing winder in the first exemplary embodiment according to the invention restricts any displacement of a rotation detecting member in a lock start direction.

As shown in FIG. 2 in detail, a W pawl 62 serving as an engaging member (a meshing member) and a rotation detecting member is housed inside of the gear ring. The W pawl 62 is pivotably supported by a pin 64 formed at the V gear 46 at a position displaced from an axis of the support shaft 26 so as to be able to oscillate within a predetermined range on an axis parallel to the support shaft 26. The W pawl 62 is configured such that its oscillation brings one end thereof into or out of contact with the ratchet gear at the inner circumferential surface of the gear ring. Due to the W pawl 62 being oscillated in a lock start direction, the one end of the W pawl 62 is moved near the ratchet gear at the inner circumferential surface of the gear ring, to thus mesh with the ratchet gear at the inner circumferential surface of the gear ring, thereby restricting the rotation of the V gear 46 in the withdrawal direction (while allowing the rotation of the V gear 46 in the winding direction).

At the other end of the W pawl 62 is formed an engaged groove 66 serving as an engaging portion, and further, at one end of the engaged groove 66 is formed an engaging surface 66A.

Moreover, to the other end of the W pawl 62 is locked one end of a sensor spring 68 serving as urging means. The sensor spring 68 is movably locked at the other end thereof to the V gear 46. The sensor spring 68 is a rod-like spring, to urge the W pawl 62 oppositely in the lock start direction.

By the V gear 46 is rotatably supported one end of a bent rod-like friction spring 70 serving as restriction urging means constituting a restricting member. The friction spring 70 is gradually elongated from one end to the other end toward one side in the lengthwise direction of the vehicle, so that it has an urging force in a direction of a rotary shaft. The friction spring 70 can be inserted at the longitudinal intermediate portion thereof into the engaged groove 66 formed at the W pawl 62.

At the other end of the friction spring 70 is fixed a substantially columnar contact member 72 serving as a contact member constituting the restricting member. The other end of the friction spring 70 is fitted around the contact member 72, which is integrated with the friction spring 70.

The contact member 72 is brought into contact (surface-contact) with the sensor holder 38 (on a plane on one side in the gear ring in the lengthwise direction of the vehicle) by the urging force of the friction spring 70. When the V gear 46 is rotated, a frictional force is generated between the contact member 72 and the sensor holder 38, so that the friction spring 70 and the contact member 72 are rotated integrally with each other. As a consequence, when the V gear 46 is rotated in the withdrawal direction, as shown in FIG. 3, the friction spring 70 and the contact member 72 are located at a rotation position in the winding direction, which is referred to as a non-restriction position, so that the friction spring 70 is separated from the engaging surface 66A of the engaged groove 66, and thus, the W pawl 62 is allowed to be oscillated in the lock start direction. In contrast, when the V gear 46 is rotated in the winding direction, as shown in FIG. 2, the friction spring 70 and the contact member 72 are located at a rotation position in the withdrawal direction, which is referred to as a restriction position, so that the friction spring 70 engages with (abuts against) the engaging surface 66A of the engaged groove 66, and thus, the W pawl 62 is restricted from being oscillated in the lock start direction.

As shown in FIG. 1, under the sensor holder 38 is disposed an acceleration sensor 74, which is secured between the sensor holder 38 and the sensor cover 40. The acceleration sensor 74 is provided with a flat base 76, which is located horizontally. The upper surface of the base 76 is formed into a curved surface 76A opened upward. On the curved surface 76A of the base 76 is mounted a globular hard ball 78 serving as an inertial member.

From the base 76 is erected a pair of vertical walls 76B, between which is turnably supported a sensor pawl 80. The sensor pawl 80 is placed on the hard ball 78. The hard ball 78 is rolled up on the curved surface 76A of the base 76, so that the sensor pawl 80 is pushed up. The sensor pawl 80 and the V gear 46 housed inside of the sensor holder 38 relate to each other. The sensor pawl 80 is pushed up by the hard ball 78, to thus mesh (engage) with the ratchet gear 46A formed at the V gear 46. Consequently, it is possible to restrict the rotation of the V gear 46 in the withdrawal direction (while to allow the rotation of the V gear 46 in the winding direction).

In the meantime, around the disposition hole 16A of the leg plate 16 is formed a ratchet gear 16B (an inner gear) whereas at one end of the locking plate 56 is formed a ratchet gear 56A. When the V gear 46, which is rotated in the withdrawal direction together with the spool 20, is restricted from being rotated, and further, the V gear 46 is relatively rotated in the winding direction with respect to the lock base 42 against the urging force of the return spring 52, the guide projection 58 of the locking plate 56 is moved to the other end of the guide slot 82 of the V gear 46, and further, the locking plate 56 is moved outside in the radial direction of the lock base 42, so that the ratchet gear 56A of the locking plate 56 meshes with the ratchet gear 16B of the leg plate 16. As a consequence, the locking plate 56 is restricted from being rotated in the withdrawal direction, so that the spool 20 is restricted from being rotated in the withdrawal direction (while the locking plate 56 and the spool 20 are allowed to be rotated in the winding direction).

<Functions and Effects of First Exemplary Embodiment According to Invention>

Next, explanation will be made on functions and effects of the present webbing winder 10.

When the webbing belt 22 wound around the spool 20 is pulled toward the tip against the urging force of the spiral spring 30 in the webbing winder 10, the spool 20 is rotated in the withdrawal direction while the webbing belt 22 is drawn out.

The webbing belt 22 drawn in this manner is stretched across a body of a passenger, and further, a tongue plate, for example, disposed in the longitudinally intermediate portion of the webbing belt 22 is held in a buckle device disposed sideways of a seat of the vehicle. In this way, the webbing belt 22 is mounted with respect to the body of the passenger.

Here, when the vehicle is rapidly decelerated, and then, the hard ball 78 is rolled up on the curved surface 76A in the acceleration sensor 74, the hard ball 78 pushes up the sensor pawl 80, which thus meshes with the ratchet gear 46A of the V gear 46, so that the V gear 46 is restricted from being rotated in the withdrawal direction. Moreover, when the body of the passenger is moved substantially to the vehicle forward side by inertia upon the rapid deceleration of the vehicle, to rapidly pull the webbing belt 22, the spool 20 (including the support shaft 26 and the lock base 42) is rapidly rotated in the withdrawal direction. As a consequence, the V gear 46 is rotated relatively to the lock base 42 in the winding direction against the urging force of the return spring 52.

In addition, when, for example, the body of the passenger is moved substantially to the vehicle forward side due to the inertia upon the deceleration of the vehicle, to rapidly pull the webbing belt 22, the spool 20 (including the support shaft 26 and the lock base 42) is rapidly rotated in the withdrawal direction, so that the V gear 46 is rapidly rotated in the withdrawal direction together with the W pawl 62, the friction spring 70, and the contact member 72.

As a consequence, the W pawl 62 tends to stay at that position without rotation with respect to the V gear 46 due to the inertia. Therefore, the W pawl 62 tends to oscillate relatively to the V gear 46 in the lock start direction against the urging force of the sensor spring 68. Additionally, the frictional force is generated between the contact member 72 and the sensor holder 38, so that the friction spring 70 and the contact member 72 are rotated integrally with each other. As a result, the friction spring 70 and the contact member 72 are located at the non-restriction position, and therefore, the friction spring 70 is separated from the engaging surface 66A of the engaged groove 66 in the W pawl 62 (see FIG. 3). Consequently, the W pawl 62 is allowed to be oscillated relatively to the V gear 46 in the lock start direction. When the W pawl 62 is oscillated relatively to the V gear 46 in the lock start direction, one end of the W pawl 62 approaches and meshes with the ratchet gear at the inner circumferential surface of the gear ring in the sensor holder 38.

Due to the one end of the W pawl 62 meshing with the ratchet gear at the inner circumferential surface of the gear ring, the rotation of the V gear 46 in the withdrawal direction is restricted. As a consequence, the V gear 46 is rotated relatively to the lock base 42 in the winding direction against the urging force of the return spring 52.

As described above, when the V gear 46 is relatively to the lock base 42 rotated in the winding direction against the urging force of the return spring 52, the guide projection 58 of the locking plate 56 is moved from one end to the other end of the guide slot 82 in the V gear 46, so that the locking plate 56 is moved outward in the radial direction of the lock base 42, and thus, the ratchet gear 56A of the locking plate 56 meshes with the ratchet gear 16B of the leg plate 16. As a consequence, the locking plate 56 is restricted from being rotated in the withdrawal direction, and further, the spool 20 is restricted from being rotated in the withdrawal direction. Thus, the webbing belt 22 can securely restrain to hold the body of the passenger who tends to move substantially to the vehicle forward side due to the inertia.

In the meantime, when the webbing belt 22 drawn out of the spool 20 is wound around the spool 20, the spool 20 (including the support shaft 26 and the lock base 42) is rotated in the winding direction by the urging force of the spiral spring 30, and then, the V gear 46 is rotated in the winding direction together with the W pawl 62, the friction spring 70, and the contact member 72 following along with the spool 20. As a consequence, the W pawl 62 tends to stay at that position without rotation with respect to the V gear 46 due to the inertia, and therefore, the W pawl 62 tends to oscillate relatively to the V gear 46 in the lock start direction against the urging force of the sensor spring 68. Moreover, the frictional force is generated between the contact member 72 and the sensor holder 38, and then, the friction spring 70 and the contact member 72 are rotated integrally with each other, so as to be located at the restriction position, so that the friction spring 70 engages with the engaging surface 66A of the engaged groove 66 in the W pawl 62 (see FIG. 2). Consequently, the W pawl 62 is restricted from being oscillated in the lock start direction relatively to the V gear 46.

In the state in which the spool 20 is rotated in the winding direction, the friction spring 70 and the contact member 72 are held at the restriction position. When the webbing belt 22 is completely wound by the spool 20, even if the spool 20 and the V gear 46 are rapidly and slightly rotated in the withdrawal direction in reaction, the friction spring 70 and the contact member 72 are maintained in the state in which they are at the restriction position, and therefore, the friction spring 70 can be kept in the state in which it engages with the engaging surface 66A of the engaged groove 66.

Consequently, as described above, even if a great acceleration in the withdrawal direction occurs at the V gear 46, and then, the W pawl 62 tends to oscillate relatively to the V gear 46 in the lock start direction due to the inertia, the engagement of the friction spring 70 with the engaging surface 66A restricts the oscillation of the W pawl 62 in the lock start direction. As a consequence, one end of the W pawl 62 cannot mesh with the ratchet gear at the inner circumferential surface of the gear ring in the sensor holder 38, thus effectively preventing the webbing winder 10 from being put into a so-called "end lock state."

Here, the member for restricting the oscillation of the W pawl 62 in the lock start direction is an integral part consisting of only the two members, that is, the friction spring 70 and the contact member 72. As a consequence, a space can be saved, mountability on the V gear 46 can be enhanced, and the V gear 46 can be miniaturized. In addition, a cost can be reduced.

Additionally, the W pawl 62 has not only the function of meshing with the ratchet gear at the inner circumferential surface of the gear ring in the sensor holder 38 but also the function of being oscillated in the lock start direction with respect to the V gear 46 by the rotation of the V gear 46. Therefore, the space can be further saved, the mountability on the V gear 46 can be further enhanced, and the V gear 46 can be further miniaturized. In addition, the cost can be further reduced.

Although the contact member 72 is secured to the other end of the friction spring 70, to be thus brought into contact with the sensor holder 38 in the present exemplary embodiment, the contact member 72 is not secured to the other end of the friction spring 70 whereas the sensor holder 38 may be brought into contact with the other end of the friction spring 70.

Second Exemplary Embodiment

Figure 4:
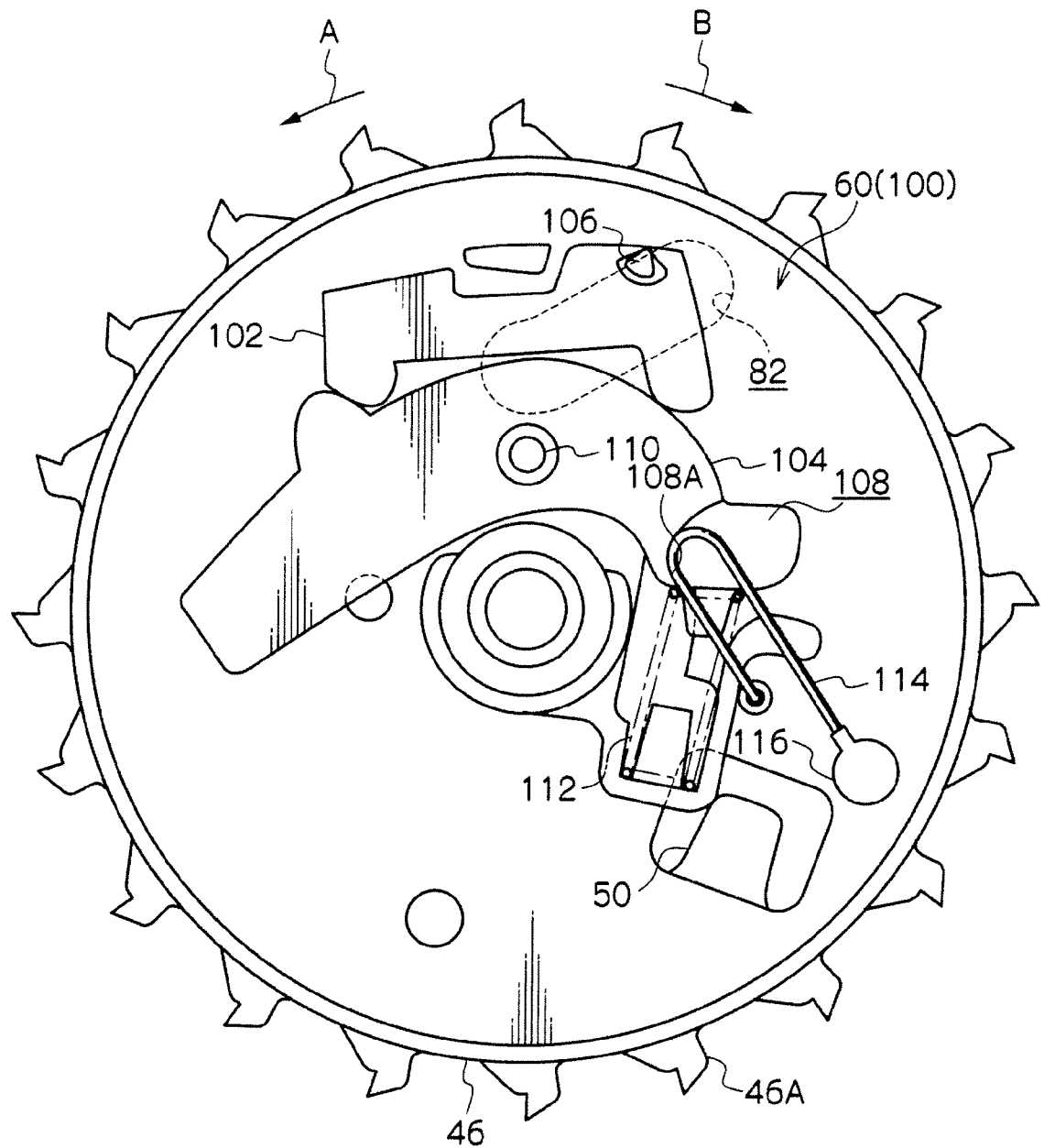
FIG. 4 is a front view showing a state in which a restricting member of a webbing winder in a second exemplary embodiment according to the invention restricts any displacement of a rotation detecting member in a lock start direction.

FIG. 4 is a front view showing essential parts of a webbing winder 100 in a second exemplary embodiment according to the invention.

The webbing winder 100 is configured in a manner substantially similar to that in the above-described first exemplary embodiment except points below.

In the webbing winder 100, a rotation detecting mechanism 60 is provided with a W pawl 102 serving as an engaging member (a meshing member) and an inertia mass 104 serving as a rotation detecting member in place of the W pawl 62 in the above-described first exemplary embodiment, wherein the W pawl 102 and the inertia mass 104 are arranged in a radial direction of a V gear 46.

The W pawl 102 is pivotably supported by a pin 106 formed at the V gear 46 at a position displaced from an axis of a support shaft 26 so as to be able to oscillate within a predetermined range on an axis parallel to the support shaft 26. The W pawl 102 is configured such that its oscillation brings one end thereof into or out of contact with a ratchet gear at an inner circumferential surface of a gear ring in the sensor holder 38. Due to the one end of the W pawl 102 being moved near the ratchet gear at the inner circumferential surface of the gear ring, the one end of the W pawl 102 meshes with the ratchet gear at the inner circumferential surface of the gear ring, thereby restricting the rotation of the V gear 46 in a withdrawal direction (while allowing the rotation of the V gear 46 in a winding direction).

The W pawl 102 is brought at one end thereof into contact with one end of the inertia mass 104: in contrast, the W pawl 102 is brought at the other end thereof into contact with the other end of the inertia mass 104. At the other end of the inertia mass 104 is formed an engaged groove 108 serving as an engaging portion, and further, at one end of the engaged groove 108 is formed an engaging surface 108A. The inertia mass 104 is supported so as to be able to oscillate within a predetermined range on the axis parallel to the support shaft 26 by a support 110 formed at the V gear 46. The inertia mass 104 is configured such that its oscillation in a lock start direction presses the W pawl 102 to oscillate it, so that one end of the W pawl 102 meshes with the ratchet gear at the inner circumferential surface of the gear ring.

Moreover, to the inertia mass 104 is locked one end of a sensor spring 112 serving as urging means. The other end of the sensor spring 112 is locked at the other end thereof to the V gear 46. The sensor spring 112 is a compression coil spring, to urge the inertia mass 104 oppositely to the lock start direction.

By the V gear 46 is rotatably supported one end of a substantially U-shaped rod-like friction spring 114 serving as restriction urging means constituting a restricting member. The friction spring 114 is gradually elongated from one end to the other end toward one side in a lengthwise direction of a vehicle, so that it has an urging force in a direction of a rotary shaft. The friction spring 114 can be inserted at the longitudinal intermediate portion thereof into the engaged groove 108 formed at the inertia mass 104.

To the other end of the friction spring 114 is fixed a substantially columnar vessel-like cover 116 (a cap) serving as a contact member constituting the restricting member. The cover 116 is opened at a surface on a side of the V gear 46. The friction spring 114 is inserted at the other end thereof through the opened portion of the cover 116, so that the friction spring 114 and the cover 116 are integrated with each other.

Figure 5:
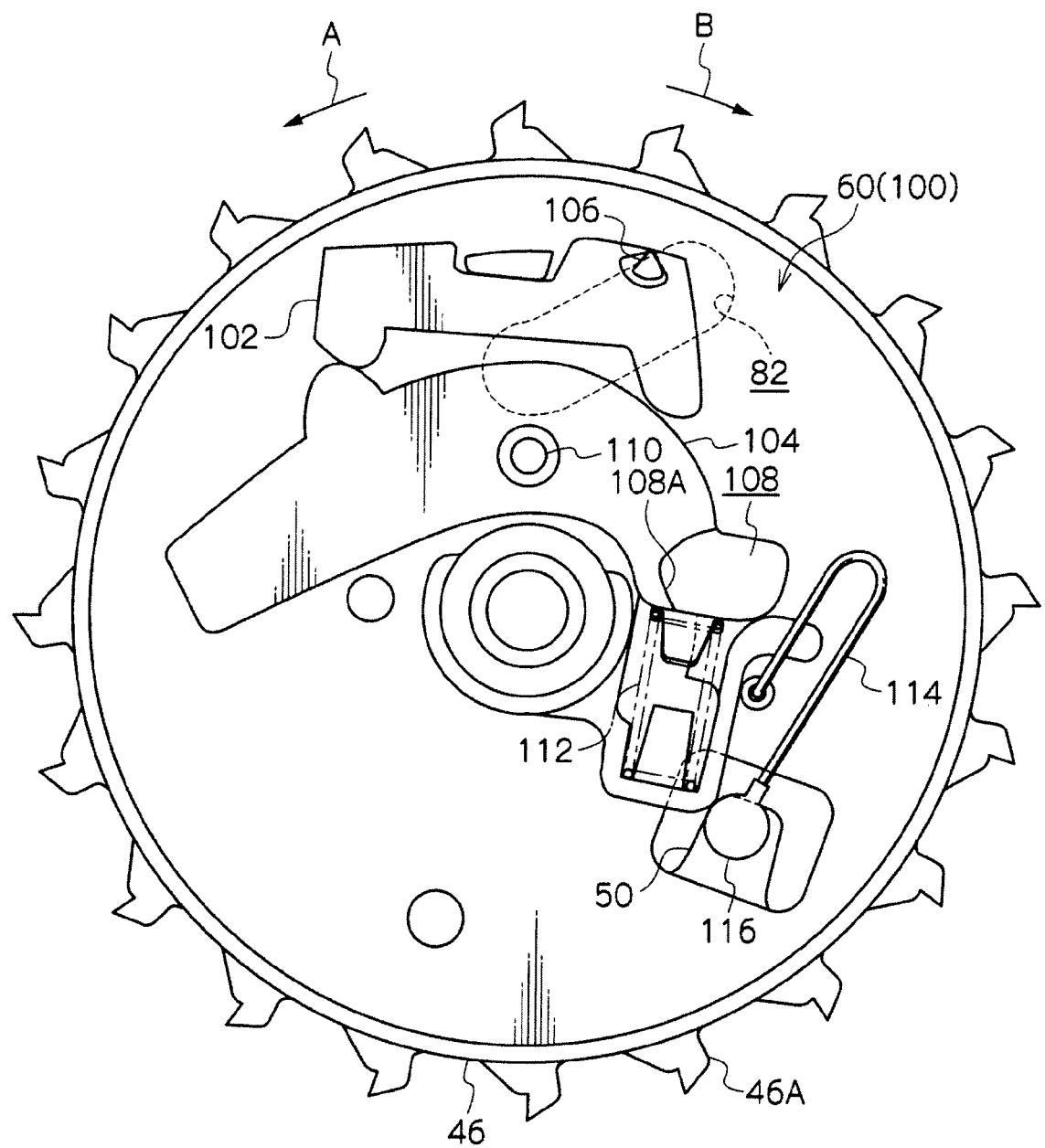
FIG. 5 is a front view showing a state in which the rotation detecting member of the webbing winder in the second exemplary embodiment according to the invention is displaced in the lock start direction.

The cover 116 is brought into contact (surface-contact) with a sensor holder 38 (on a plane on one side in the gear ring in the lengthwise direction of the vehicle) by the urging force of the friction spring 114. When the V gear 46 is rotated, a frictional force is generated between the cover 116 and the sensor holder 38, so that the friction spring 114 and the cover 116 are rotated integrally with each other. As a consequence, when the V gear 46 is rotated in the withdrawal direction, as shown in FIG. 5, the friction spring 114 and the cover 116 are located at a rotation position in the winding direction, which is referred to as a non-restriction position, so that the friction spring 114 is separated from the engaging surface 108A of the engaged groove 108, to be thus allowed to be oscillated in the lock start direction of the inertia mass 104. In contrast, when the V gear 46 is rotated in the winding direction, as shown in FIG. 4, the friction spring 114 and the cover 116 are located at a rotation position in the withdrawal direction, which is referred to as a restriction position, so that the friction spring 114 engages with (abuts against) the engaging surface 108A of the engaged groove 108, and thus, the inertia mass 104 is restricted from being oscillated in the lock start direction.

Here, when a body of a passenger is moved substantially to the vehicle forward side by inertia upon deceleration of the vehicle, to rapidly pull a webbing belt 22, a spool 20 (including the support shaft 26 and a lock base 42) is rapidly rotated in the withdrawal direction, so that the V gear 46 is rapidly rotated in the withdrawal direction together with the W pawl 102, the inertia mass 104, the friction spring 114, and the cover 116.

As a consequence, the inertia mass 104 tends to stay at that position without rotation with respect to the V gear 46 due to the inertia. Thus, the inertia mass 104 tends to be oscillate in the lock start direction relatively to the V gear 46 against the urging force of the sensor spring 112. Additionally, the frictional force is generated between the cover 116 and the sensor holder 38, so that the friction spring 114 and the cover 116 are rotated integrally with each other. As a result, the friction spring 114 and the cover 116 are located at the non-restriction position, and therefore, the friction spring 114 is separated from the engaging surface 108A of the engaged groove 108 in the inertia mass 104 (see FIG. 5). Consequently, the inertia mass 104 is allowed to be oscillated relatively to the V gear 46 in the lock start direction. When the inertia mass 104 is oscillated relatively to the V gear 46 in the lock start direction, the inertia mass 104 presses the W pawl 102 and causes it to oscillate, so that one end of the W pawl 102 approaches and meshes with the ratchet gear at the inner circumferential surface of the gear ring in the sensor holder 38.

Due to the one end of the W pawl 102 meshing with the ratchet gear at the inner circumferential surface of the gear ring, the rotation of the V gear 46 in the withdrawal direction is restricted. As a consequence, the V gear 46 is rotated relatively to a lock base 42 in the winding direction against the urging force of a return spring 52.

In the meantime, when the webbing belt 22 drawn out of the spool 20 is wound around the spool 20, the spool 20 (including the support shaft 26 and the lock base 42) is rotated in the winding direction by an urging force of a spiral spring 30, and then, the V gear 46 is rotated in the winding direction together with the W pawl 102, the inertia mass 104, the friction spring 114, and the cover 116 following along with the spool 20. As a consequence, the inertia mass 104 tends to stay at that position without rotation with respect to the V gear 46 due to the inertia, and therefore, the inertia mass 104 tends to oscillate relatively to the V gear 46 in the lock start direction against the urging force of the sensor spring 112. Moreover, the frictional force is generated between the cover 116 and the sensor holder 38, and then, the friction spring 114 and the cover 116 are rotated integrally with each other, to be thus located at the restriction position, so that the friction spring 114 engages with the engaging surface 108A of the engaged groove 108 in the inertia mass 104 (see FIG. 4). Consequently, the inertia mass 104 is restricted from being oscillated relatively to the V gear 46 in the lock start direction.

In the state in which the spool 20 is rotated in the winding direction, the friction spring 114 and the cover 116 are held at the restriction position. When the webbing belt 22 is completely wound by the spool 20, even if the spool 20 and the V gear 46 are rapidly and slightly rotated in the withdrawal direction in reaction, the friction spring 114 and the cover 116 are maintained in the state in which they are at the restriction position, and therefore, the friction spring 114 can be kept in the state in which it engages with the engaging surface 108A of the engaged groove 108.

Consequently, as described above, even if a great acceleration occurs at the V gear 46 in the withdrawal direction, and then, the inertia mass 104 tends to oscillate relatively to the V gear 46 in the lock start direction due to the inertia, the engagement of the friction spring 114 with the engaging surface 108A restricts the oscillation of the inertia mass 104 in the lock start direction. As a consequence, the inertia mass 104 cannot push up the W pawl 102, and further, the other end of the W pawl 102 is brought into contact with the inertia mass 104, thereby restricting the oscillation of the W pawl 102. Therefore, one end of the W pawl 102 cannot mesh with the ratchet gear at the inner circumferential surface of the gear ring in the sensor holder 38.

Thus, in the webbing winder 100, the W pawl 102 meshes with the ratchet gear at the inner circumferential surface of the gear ring when the webbing belt 22 is completely wound by the spool 20, thus effectively preventing a so-called "end lock state" of the webbing winder 100.

As described above, the present exemplary embodiment also can produce the same functions and effects as those in the above-described first exemplary embodiment except the function and effect produced by the two functions equipped in the W pawl 62.

Although the cover 116 is secured to the other end of the friction spring 114, to be thus brought into contact with the sensor holder 38 in the present exemplary embodiment, the cover 116 is not secured to the other end of the friction spring 114 whereas the other end of the friction spring 114 may be brought into contact with the sensor holder 38.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A webbing winder comprising:
   a spool which is rotated in a winding direction so as to wind a webbing belt, and is rotated in a withdrawal direction so as to draw out the webbing belt;
   a rotary member which is rotatably disposed relatively to the spool, and is connected in such a manner as to be able to rotate following along with the spool;
   a locking member which is operated to restrict the rotation of the spool in the withdrawal direction;
   a rotation detecting member which is disposed in the rotary member, and is displaced in a predetermined lock start direction that actuates the locking member when the rotary member is rotated at a predetermined angular speed or higher in the withdrawal direction; and
   a restricting member which is disposed in the rotary member so as to restrict the rotation detecting member from being displaced in the lock start direction in reaction to stoppage of winding of the webbing belt by the spool by engagement with the rotation detecting member,
   wherein the restricting member includes a bent rod-like friction spring and a contact member that is able to be moved with respect to the rotary member upon the generation of a frictional force by the rotary member; and
   the friction spring is rotatably supported at one end thereof by the rotary member, and the friction spring is fitted at the other end thereof around the contact member, and includes a bent portion that engages and disengages the rotation detecting member.

2. The webbing winder of claim 1, wherein the restricting member inhibits a displacement restriction of the rotation detecting member in the lock start direction when the rotary member rotates in the withdrawal direction which is not the lock start direction.

3. The webbing winder of claim 1, wherein the restricting member is movable between a restriction position, at which the rotation detecting member is restricted from being displaced in the lock start direction, and a non-restriction position, at which the rotation detecting member is displaceable in the lock start direction, so that the restricting member is moved to the restriction position by the rotation of the rotary member in the winding direction.

4. The webbing winder of claim 1, further comprising an urging member which urges the rotation detecting member in a direction reverse to the lock start direction.

5. The webbing winder of claim 1, wherein the rotation detecting member has an engaging portion formed at one end thereof; and the bent portion of the friction spring is inserted into the engaging portion when the restricting member engages with the rotation detecting member.

* * * * *